United States Patent
Luo et al.

(10) Patent No.: US 9,910,185 B2
(45) Date of Patent: Mar. 6, 2018

(54) PULSED CHEMICAL NEUTRON SOURCE

(71) Applicant: Halliburton Energy Services, Inc., Houston, TX (US)

(72) Inventors: Da Luo, Houston, TX (US); Weijun Guo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/770,615

(22) PCT Filed: May 30, 2013

(86) PCT No.: PCT/US2013/043301
§ 371 (c)(1),
(2) Date: Aug. 26, 2015

(65) Prior Publication Data
US 2016/0327679 A1    Nov. 10, 2016

(51) Int. Cl.
*G01V 5/10* (2006.01)
*G21K 1/04* (2006.01)
*G21G 4/02* (2006.01)

(52) U.S. Cl.
CPC .............. *G01V 5/10* (2013.01); *G21G 4/02* (2013.01); *G21K 1/043* (2013.01)

(58) Field of Classification Search
CPC .................. G01V 5/10; G21K 1/043
See application file for complete search history.

(56) References Cited

U.S. PATENT DOCUMENTS

| 3,388,253 | A | * | 6/1968 | Mills, Jr. | G01V 5/102 250/262 |
| 3,389,257 | A | * | 6/1968 | Caldwell | G01V 5/108 250/256 |
| 3,427,455 | A |   | 2/1969 | Will et al. | |
| 3,435,216 | A | * | 3/1969 | Givens | G01V 5/105 250/262 |
| 3,751,668 | A | * | 8/1973 | Coleman | G01V 5/10 376/191 |

(Continued)

FOREIGN PATENT DOCUMENTS

CN    104376890 A  *  2/2015

OTHER PUBLICATIONS

GCC Examination Report Application No. GC 2014-27272, Oct 19, 2017, 7 pages.

*Primary Examiner* — Christine Sung
(74) *Attorney, Agent, or Firm* — Gilliam IP PLLC (57) ABSTRACT

Various embodiments include systems and methods to provide a pulsed chemical neutron source. The pulsed chemical neutron source can be used in well logging applications. Apparatus can be arranged to generate neutrons from a chemical neutron emitter and to pass the neutrons through an aperture of a neutron shield when the chemical neutron emitter aligns with the aperture such that the neutrons are substantially blocked by the neutron shield when the chemical neutron emitter is unaligned with the aperture. In various embodiments, movement of one or more of the chemical neutron emitter or the neutron shield can be controlled such that the aperture and the chemical neutron emitter operatively align with each other during a selected portion of the movement, generating pulses of neutrons output from the neutron shield. Additional apparatus, systems, and methods are disclosed.

29 Claims, 6 Drawing Sheets

(56) References Cited

U.S. PATENT DOCUMENTS

| | | | |
|---|---|---|---|
| 4,757,209 A | 7/1988 | Kreissl et al. | |
| 6,144,032 A * | 11/2000 | Gazdzinski | G01N 23/222 |
| | | | 250/269.6 |
| 7,573,044 B2 * | 8/2009 | Norris | G01V 5/0008 |
| | | | 250/390.04 |
| 7,820,992 B2 | 10/2010 | Yoshida | |
| 8,080,808 B2 * | 12/2011 | Norris | G01V 5/0008 |
| | | | 250/390.04 |
| 2009/0121161 A1 * | 5/2009 | Yoshida | G21K 1/043 |
| | | | 250/505.1 |
| 2010/0332138 A1 | 12/2010 | Inanc et al. | |
| 2012/0126106 A1 | 5/2012 | Zhou et al. | |

* cited by examiner

PULSED CHEMICAL NEUTRON SOURCE

PRIORITY APPLICATIONS

This application is a U.S. National Stage Filing under 35 U.S.C. 371 from International Application No. PCT/US2013/043301, filed on 30 May 2013, which application is incorporated herein by reference in its entirety.

TECHNICAL FIELD

The present invention relates generally to apparatus and methods of making measurements with respect to a drilling operation.

BACKGROUND

Radioactive chemical neutron sources are widely used in thermal/epithermal neutron logging tools. These sources are statically mounted such that their output is constant and typically lacks the flexibility of pulsed neutron tools. Pulsed neutron tools employ timing gates to differentiate inelastic gamma and capture gamma rays, which are then used to determine rock properties. Typically, pulsed neutron tools in the industry use deuterium, tritium (D, T) neutron generators, which require charged particle accelerators. The usefulness of such measurements may be related to their complexity, to the precision or quality of the information and the presentation of the information derived from such measurements, and combinations thereof.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
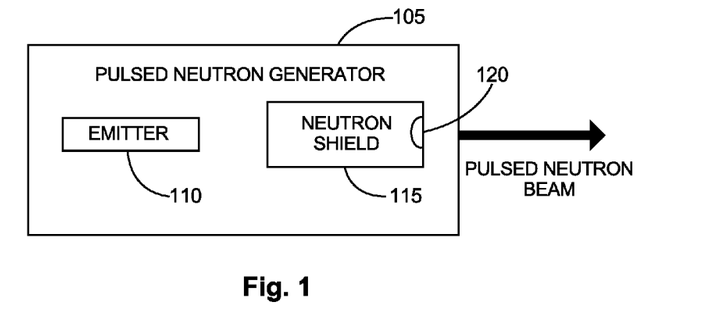
FIG. 1 shows an apparatus having an example pulsed neutron generator, in accordance with various embodiments.

FIG. 1 shows an example embodiment of an apparatus having a pulsed neutron generator 105. The pulsed neutron generator 105 can comprise an emitter 110 and a neutron shield 115 having an aperture 120. The neutron shield 115 can be structured in an arrangement with the emitter 110 such that a chopper to neutrons emitted from the emitter 110 is operatively generated by the arrangement of the emitter 110 and the neutron shield 115. The emitter 110 can be realized as a chemical neutron emitter. The chemical neutron emitter may provide a constant source of neutrons. The chemical neutron emitter can include one or more radioactive isotopes.

Control of the arrangement of the emitter 110 relative to the neutron shield 115 can make the combination of the emitter 110 and the neutron shield 115 operable as the pulsed neutron generator 105 from which a pulsed neutron beam is output. The neutron shield 115 can block neutrons from being output from the pulsed neutron generator 105 except through aperture 120. Movement of the emitter 110 and neutron shield 115 relative to each other provides a chopper function to a neutrons beam or a neutron beam emitted from the emitter 110. The relative movement can be provided by controlling movement of the emitter 110, the neutron shield 115, or combinations of the emitter 110 and the neutron shield 115. The control of the relative movement can be realized having a selected frequency of the relative movement. A number of different arrangements of the emitter 110 and the neutron shield 115 may be implemented to provide the relative movement to generate a chopper function to the neutrons generated by the emitter 110.

Figure 2:
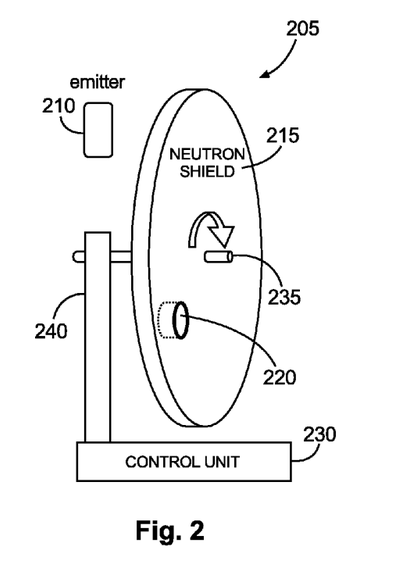
FIG. 2 shows an example of a pulsed neutron generator having a moving neutron shield design, in accordance with various embodiments.

FIG. 2 shows an example embodiment of a pulsed neutron generator 205 having a moving neutron shield design. The moving neutron shield design can include an emitter/neutron shield arrangement that can include an emitter 210 in a fixed position and a neutron shield 215 that is moveable, where the neutron shield 215 has an aperture 220. The pulsed neutron generator 205 can include a control unit 230 to move the neutron shield 215. The neutron shield 215 can be structured as a moveable shield such that the aperture 220 operatively aligns with the emitter 210 during a selected portion of movement of the neutron shield 215. The moveable motion of the neutron shield 215 can be a rotation around an axis structure 235 of a mounting platform 240. The neutron shield 215 can be positioned in a path of the neutrons emitted from the emitter 210. The neutron shield 215 can be structured as a rotatable shield such that the aperture 220 operatively aligns with the emitter 210 at one angular region in each rotation of the neutron shield 215. The aperture 220 can be arranged to operatively provide an output of the pulsed neutron generator 205. The output can be provided by the alignment of the emitter 210 and the aperture 220, where neutrons are blocked from output from the pulsed neutron generator 205 when the emitter 210 is not in alignment with the aperture 220. The neutron shield 215 may be controlled similar to an optical chopper.

The emitter 210 can be realized as a chemical neutron emitter. The chemical neutron emitter may provide a constant source of neutrons. The chemical neutron emitter can include one or more radioactive isotopes. The chopping of the neutron beam can be controlled by the control unit 230. The control unit 230 can include circuitry structured to regulate motion of the neutron shield 215 at a selected frequency. In FIG. 2, regulation of motion by the control unit 230 is shown as a clockwise rotation to rotate the neutron shield 215. Motion can be attained as a counterclockwise rotation. Other motions of the neutron shield 215 can be controlled relative to the fixed emitter 210 to provide a chopping of the neutron beam output from the pulsed neutron generator 205.

Figure 3:
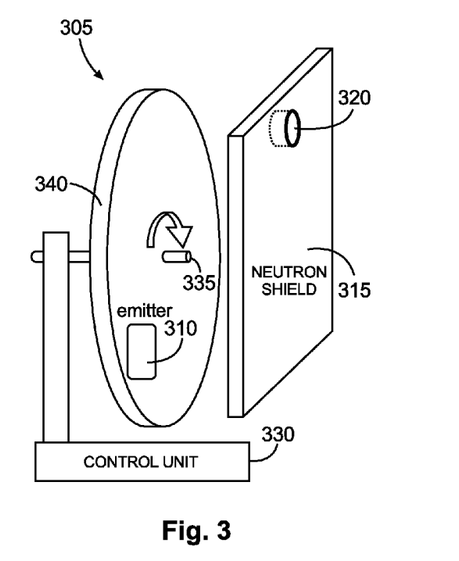
FIG. 3 shows an example of a pulsed neutron generator having a moving emitter design, in accordance with various embodiments.

FIG. 3 shows an example embodiment of a pulsed neutron generator 305 having a moving emitter design. The moving emitter design can include an emitter/neutron shield arrangement that can include a neutron shield 315 in a fixed position, where the neutron shield 315 has an aperture 320, and an emitter 310 that is moveable. The pulsed neutron generator 305 can include a control unit 330 to move the emitter 310. The emitter 310 can be attached to a platform 340, where the platform 340 is moveable such that the emitter 310 is operatively aligned with the aperture 320 during a selected portion of movement of the platform 340. The aperture 320 can be arranged to operatively provide an output of the pulsed neutron generator 305. The moveable motion of the platform 340 can be a rotation around an axis structure 335 of platform 340. The neutron shield 315 can be positioned in a path of the neutrons emitted from the emitter 310. The platform 340 with the emitter 310 attached thereon can be structured as a rotatable platform such that the emitter 310 operatively aligns with the aperture 320 at one angular region in each rotation of the platform 340. The aperture 320 can be arranged to operatively provide an output of the pulsed neutron generator 305. The output can be provided by the alignment of the emitter 310 and the aperture 320, where neutrons are blocked from output from the pulsed neutron generator 305 when the emitter 210 is not in alignment with the aperture 320.

The emitter 310 can be realized as a chemical neutron emitter. The chemical neutron emitter may provide a constant source of neutrons. The chemical neutron emitter can include one or more radioactive isotopes. The chopping of the neutron beam can be controlled by the control unit 330. The control unit 330 can include circuitry structured to regulate motion of the platform 340 at a selected frequency. In FIG. 3, regulation of motion by the control unit 330 is shown as a clockwise rotation to rotate the platform 340. Motion can be attained as a counterclockwise rotation. Other motions of the emitter 310 can be controlled relative to the fixed neutron shield 315 to provide a chopping of the neutron beam to output from the pulsed neutron generator 305.

Figure 4A:
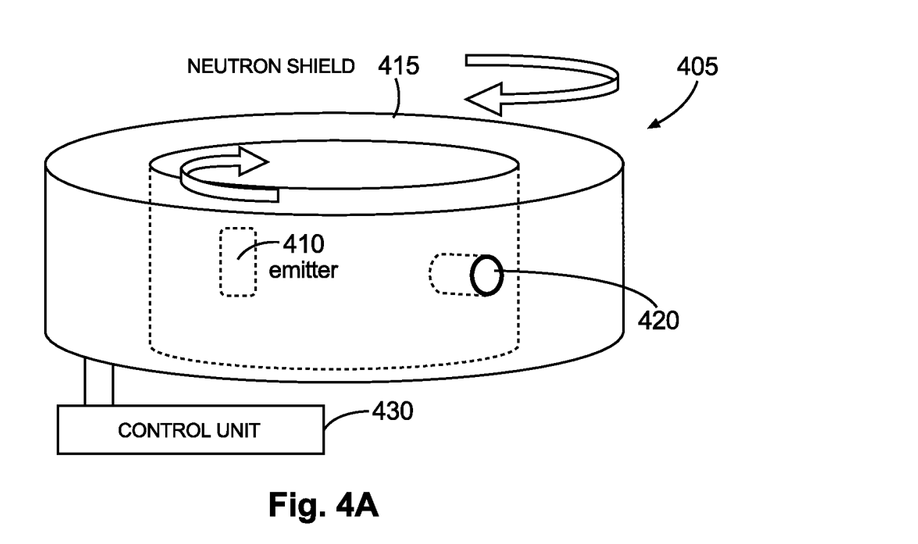
FIGS. 4A-4B show an example of a pulsed neutron generator having a design of a moving neutron shield around an emitter, in accordance with various embodiments.
Figure 4B:
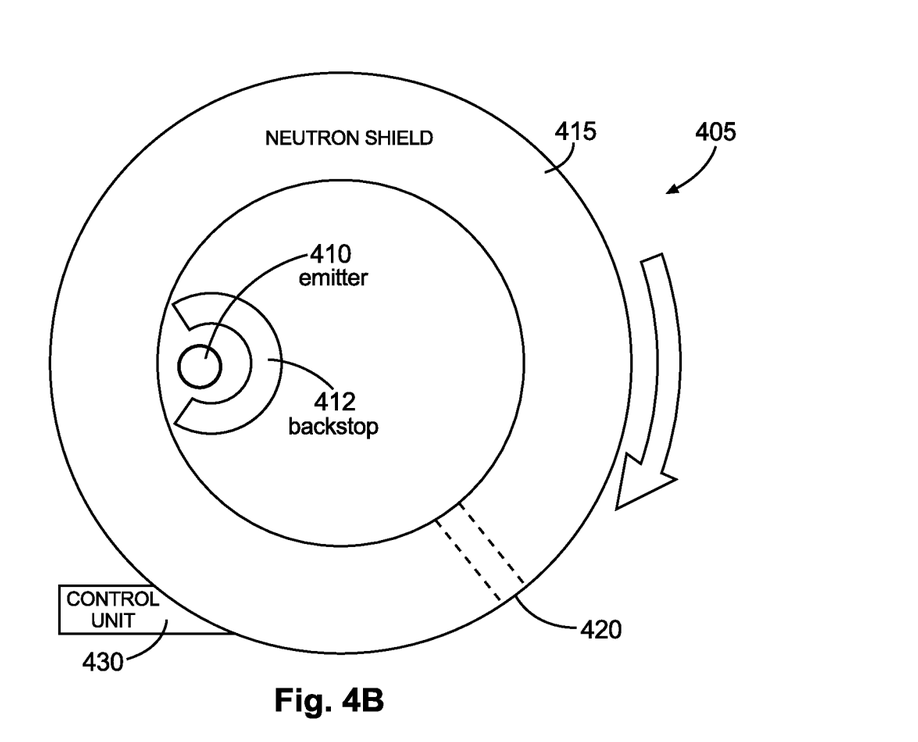

FIGS. 4A-4B show views of an example embodiment of a pulsed neutron generator 405 having a design of a moving neutron shield around an emitter. The design of a moving neutron shield around an emitter can include an emitter/neutron shield arrangement that can include an emitter 410 in a fixed position and a neutron shield 415 positioned to move around the emitter 410 such that an aperture 420 of the neutron shield 415 operatively aligns with the emitter 410 during a selected portion of the movement of the neutron shield 415 around the emitter 410. The neutron shield 415 can be structured to completely encircle the emitter 410. The pulsed neutron generator 405 can include a control unit 430 to move the neutron shield 415 around the emitter 410. The neutron shield 415 can be positioned to rotate around the emitter 410 such that the aperture 420 operatively aligns with the emitter 410 at one angular region in each rotation of the neutron shield 415 around the emitter 410. This rotation can be regulated by the control unit 430. The aperture 420 can be arranged to operatively provide an output of the pulsed neutron generator 405. The output can be provided by the alignment of the emitter 410 and the aperture 420, where neutrons are blocked from output from the pulsed neutron generator 405 when the emitter 410 is not in alignment with the aperture 420.

The emitter 410 can be realized as a chemical neutron emitter. The chemical neutron emitter may provide a constant source of neutrons. The chemical neutron emitter can include one or more radioactive isotopes. The chopping of the neutron beam can be controlled by the control unit 430. The control unit 430 can include circuitry structured to regulate motion of the neutron shield 415 at a selected frequency. In FIGS. 4A-4B, regulation of motion by the control unit 430 is shown as a clockwise rotation to rotate the neutron shield 415. Motion can be attained as a counterclockwise rotation. Other motions of the neutron shield 415 can be controlled relative to the fixed emitter 410 at varying frequencies to provide a chopping of the neutron beam output from the pulsed neutron generator 405.

The view in FIG. 4B shows use of an optional backstop 412. Backstop 412 can be used to direct neutrons from the emitter 410 in a specified direction. This arrangement may be used to avoid neutrons from passing through aperture 420 from reflections from within neutron shield 415 when the emitter 410 is not aligned with the aperture 420. With an emitter structured to emit neutrons in an omnidirectional manner, backstop 412 can provide a mechanism to effectively generate neutrons in a limited number of directions from the emitter. Other mechanisms may be used to set a direction of neutron flow from an emitter for alignment with an output of pulsed neutron generator 405.

Figure 5A:
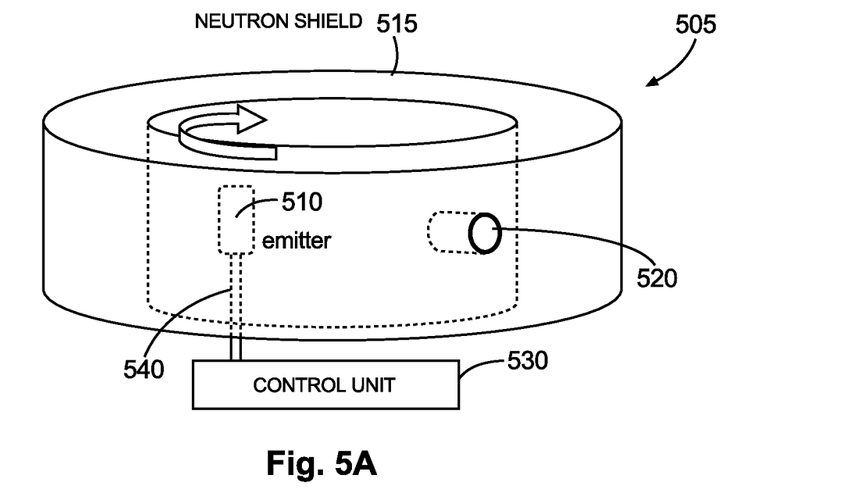
FIGS. 5A-5B show an example of a pulsed neutron generator having a design of a neutron shield positioned around a moving emitter, in accordance with various embodiments.
Figure 5B:
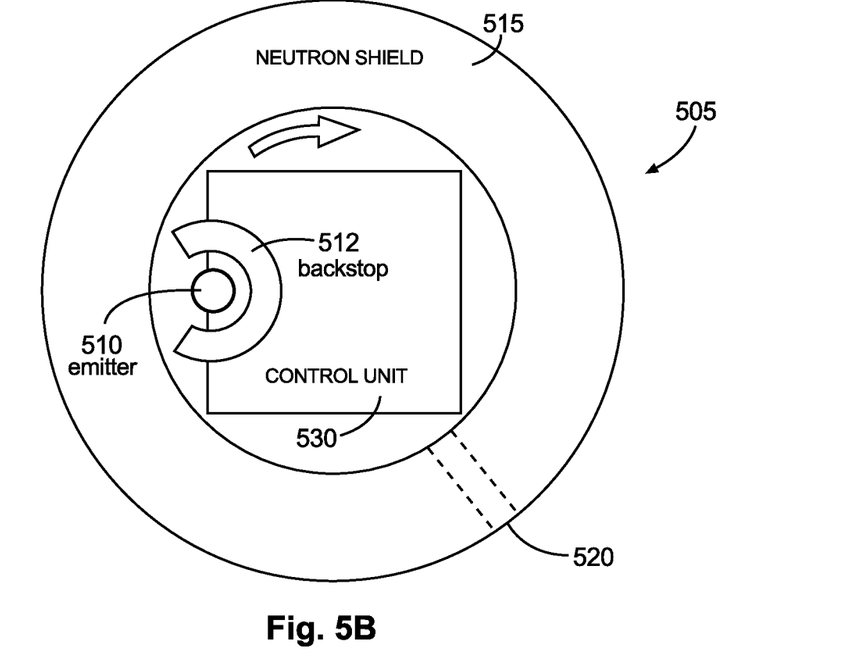

FIGS. 5A-5B show an example embodiment of an example pulsed neutron generator 505 having a design of a neutron shield positioned around a moving emitter. The design of a neutron shield positioned around a moving emitter can include an emitter/neutron shield arrangement that can include a neutron shield 515 in a fixed position and an emitter 510 attached to a platform 540 with the neutron shield 515 surrounding the emitter 510. The platform 540 can be moveable inside of the neutron shield 515 (within an entire surface of the neutron shield 515) such that the emitter 510 is operatively aligned with the aperture 520 during a selected portion of movement of the platform 540. The pulsed neutron generator 505 can include a control unit 430 to move the emitter 410 inside the neutron shield 515. The platform 540 with the emitter attached thereon can be rotatable inside of the neutron shield 515 such that the emitter 510 is operatively aligned with the aperture 520 at one angular region in each rotation of the platform 540. This rotation can be regulated by the control unit 530. The aperture 520 can be arranged to operatively provide an output of the pulsed neutron generator 505. The output can be provided by the alignment of the emitter 510 and the aperture 520, where neutrons are blocked from output from the pulsed neutron generator 505 when the emitter 510 is not in alignment with the aperture 520.

The emitter 510 can be realized as a chemical neutron emitter. The chemical neutron emitter may provide a constant source of neutrons. The chemical neutron emitter can include one or more radioactive isotopes. The chopping of the neutron beam can be controlled by the control unit 530. The control unit 530 can include circuitry structured to regulate motion of the emitter 510 at a selected frequency.

In FIGS. 5A-5B, regulation of motion by the control unit 530 is shown as a clockwise rotation to rotate the emitter 510. Motion can be attained as a counterclockwise rotation. Other motions of the emitter 510 can be controlled relative to the fixed neutron shield 515 at varying frequencies to provide a chopping of the neutron beam output from the pulsed neutron generator 505.

The view in FIG. 5B shows use of an optional backstop 512. Backstop 512 can be used to direct neutrons from the emitter 510 in a specified direction. This arrangement may be used to avoid neutrons from passing through aperture 520 from reflections from within neutron shield 515 when the emitter 510 is not aligned with the aperture 520. With an emitter structured to emit neutrons in an omnidirectional manner, backstop 512 can provide a mechanism to effectively generate neutrons in a limited number of directions from the emitter. Other mechanisms may be used to set a direction of neutron flow from an emitter for alignment with an output of pulsed neutron generator 505.

Figure 6:
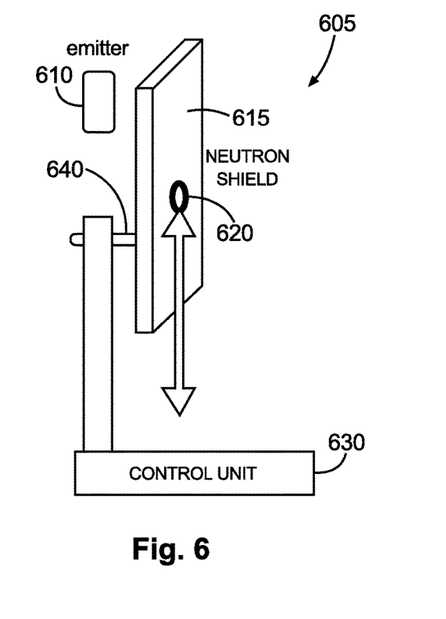
FIG. 6 shows an example of a pulsed neutron generator having a linearly moving neutron shield design, in accordance with various embodiments.

FIG. 6 shows an example embodiment of an example pulsed neutron generator 605 having a linearly moving neutron shield design. The linearly moving neutron shield design can include an emitter/neutron shield arrangement that can include an emitter 610 in a fixed position and an neutron shield 615 positioned in a path of neutrons emitted from the emitter 610, where the neutron shield 615 can be structured to move linearly across the path of the neutrons such that an aperture 620 of the neutron shield 615 operatively aligns with the emitter 610 at a position in the linear movement of the neutron shield 615. The pulsed neutron generator 605 can include a control unit 630 to move the neutron shield. The neutron shield 615 can be structured to oscillate linearly across the path of the neutrons such that the aperture 620 operatively aligns with the emitter 610 at a position in the linear oscillation of the neutron shield 615. The movement of the neutron shield 615 can be realized with the control unit 630 driving a platform 640 to which the neutron shield 615 can be attached. The aperture 620 can be arranged to operatively provide an output of the pulsed neutron generator 605. The output can be provided by the alignment of the emitter 610 and the aperture 620, where neutrons are blocked from output from the pulsed neutron generator 605 when the emitter 610 is not in alignment with the aperture 620.

The emitter 610 can be realized as a chemical neutron emitter. The chemical neutron emitter may provide a constant source of neutrons. The chemical neutron emitter can include one or more radioactive isotopes. The chopping of the neutron beam can be controlled by the control unit 630. The control unit 630 can include circuitry structured to regulate motion of the neutron shield 615 at a selected frequency. Other motions of the neutron shield 615 can be controlled relative to the fixed emitter 610 at varying frequencies to provide a chopping of the neutron beam output from the pulsed neutron generator 605.

Figure 7:
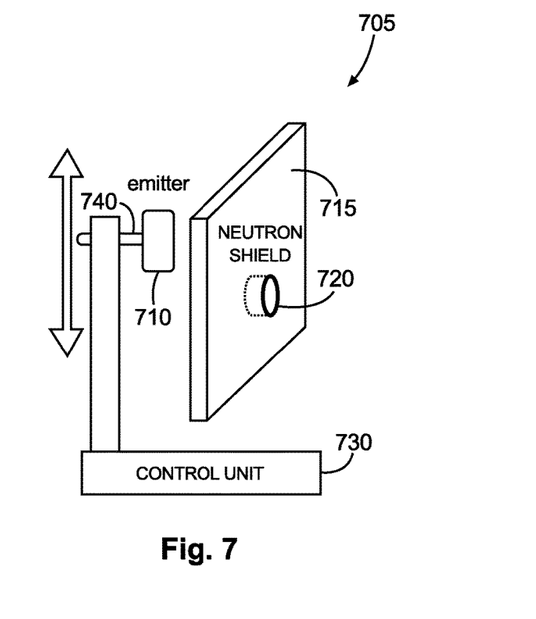
FIG. 7 shows an example of a pulsed neutron generator having a linearly moving emitter design, in accordance with various embodiments.

FIG. 7 shows an example of a pulsed neutron generator 705 having a linearly moving emitter design. The linearly moving emitter design can include an emitter/neutron shield arrangement that can include a neutron shield 715 in a fixed position, where the neutron shield has an aperture 720, and an emitter 710 attached to a platform 740. The platform 740 can be structured to move in a linear direction such that the emitter 710 is operatively aligned with the aperture 720 at a position in the linear movement of the emitter 710. The pulsed neutron generator 705 can include a control unit 730 to move the emitter 710. The movement of the emitter 710 can be realized with the control unit 630 driving the platform 740 to which the emitter 710 can be attached. The platform 740 can be structured to oscillate in a linear direction such that the emitter 710 is operatively aligned with the aperture 720 at a position in the linear oscillation of the neutron shield 715. The aperture 720 can be arranged to operatively provide an output of the pulsed neutron generator 705. The output can be provided by the alignment of the emitter 710 and the aperture 720, where neutrons are blocked from output from the pulsed neutron generator 705 when the emitter 710 is not in alignment with the aperture 720.

The emitter 710 can be realized as a chemical neutron emitter. The chemical neutron emitter may provide a constant source of neutrons. The chemical neutron emitter can include one or more radioactive isotopes. The chopping of the neutron beam can be controlled by the control unit 730. The control unit 730 can include circuitry structured to regulate motion of the emitter 710 at a selected frequency. Other motions of the emitter 710 can be controlled relative to the fixed neutron shield 715 at varying frequencies to provide a chopping of the neutron beam output from the pulsed neutron generator 705.

Figure 8:
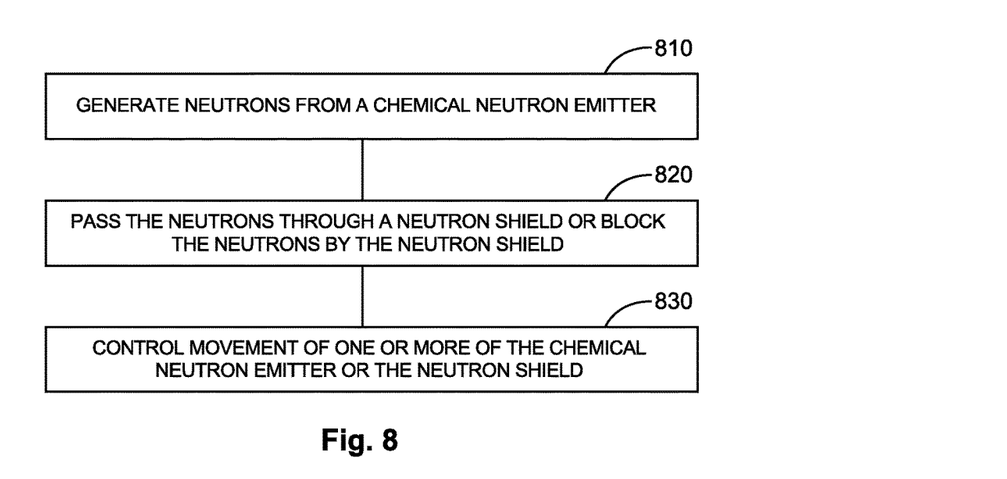
FIG. 8 shows features of an example method that includes providing a pulsed chemical neutron source, in accordance with various embodiments.

FIG. 8 shows features of an embodiment of a method that includes providing a pulsed chemical neutron source. Such a pulsed chemical neutron source can be used in well logging applications. At 810, neutrons are generated from a chemical neutron emitter. Generating neutrons from the chemical neutron emitter can include generating neutrons using one or more radioactive isotopes.

At 820, the neutrons are passed through a neutron shield or blocked by the neutron shield. The neutrons are passed through an aperture of the neutron shield when the chemical neutron emitter aligns with the aperture such that the neutrons are substantially blocked by the neutron shield when the chemical neutron emitter is unaligned with the aperture.

At 830, movement of one or more of the chemical neutron emitter or the neutron shield is controlled. The control can be realized such that the aperture and the chemical neutron emitter operatively align with each other during a selected portion of the movement, generating pulses of neutrons output from the neutron shield. Controlling movement can include controlling movement of the neutron shield with the chemical neutron emitter fixed or controlling movement of the chemical neutron emitter with the neutron shield fixed. With the chemical neutron emitter or the neutron shield fixed, controlling the movement can include driving the respective movement by a rotational movement in a plane across a direction that aligns the chemical neutron emitter with the neutron shield. With the chemical neutron emitter or the neutron shield fixed, controlling the movement can include driving the respective movement by a rotational movement with the chemical neutron emitter surrounded by the neutron shield. With the chemical neutron emitter or the neutron shield fixed, controlling the movement can include driving the respective movement by a linear movement. The linear movement can include an oscillatory linear motion. Controlling movement can include controlling the movement with a selected frequency of the movement. Controlling movement can include controlling the movement with a selected variation of frequency of the movement.

In various embodiments, methods using pulsed chemical neutron source can include generating pulsed neutrons in a borehole from an apparatus having a pulsed neutron generator structured according to an apparatus similar to or identical to apparatus disclosed herein or combinations thereof; analyzing signals in a processing unit from generating the pulsed neutrons in the borehole; and directing a drilling-based operation in response to analyzing the signals.

The drilling-based operation can include, but is not limited to, storing parameters correlated to the formation in which the borehole is formed, generating data providing information on formation properties, generating a visual representation of formation properties, and other activities associated with well logging. In addition, a machine-readable storage device can have instructions stored thereon, which, when performed by a machine, cause the machine to perform operations, the operations comprising any of the features using a pulsed chemical neutron source discussed herein.

Various components of a system operable to perform measurements using a pulsed chemical neutron source can be realized in combinations of hardware and software based implementations. These implementations may include a machine-readable storage device having machine-executable instructions, such as a computer-readable storage device having computer-executable instructions, to control the measurement system, store and implement parameters for measurements, store results, and communicate with other systems to provide data, analysis, or combinations of data and analysis. The instructions can include instructions to generate neutrons from a chemical neutron emitter; to pass the neutrons through an aperture of a neutron shield when the chemical neutron emitter aligns with the aperture such that the neutrons are substantially blocked by the neutron shield when the chemical neutron emitter is unaligned with the aperture; and to control movement of one or more of the chemical neutron emitter or the neutron shield such that the aperture and the chemical neutron emitter operatively align with each other during a selected portion of the movement, generating pulses of neutrons output from the neutron shield. The chemical neutron emitter can include one or more radioactive isotopes. Controlling movement can include controlling movement of the neutron shield with the chemical neutron emitter fixed or controlling movement of the chemical neutron emitter with the neutron shield fixed. Controlling the movement can include driving the respective movement by a rotational movement in a plane across a direction that aligns the chemical neutron emitter with the neutron shield. Controlling the movement can include driving the respective movement by a rotational movement with the chemical neutron emitter surrounded by the neutron shield. Controlling the movement can include driving the respective movement by a linear movement. The linear movement can include an oscillatory linear motion. Controlling movement can include controlling the movement with a selected frequency of the movement. Controlling movement can include controlling the movement with a selected variation of frequency of the movement. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 9:
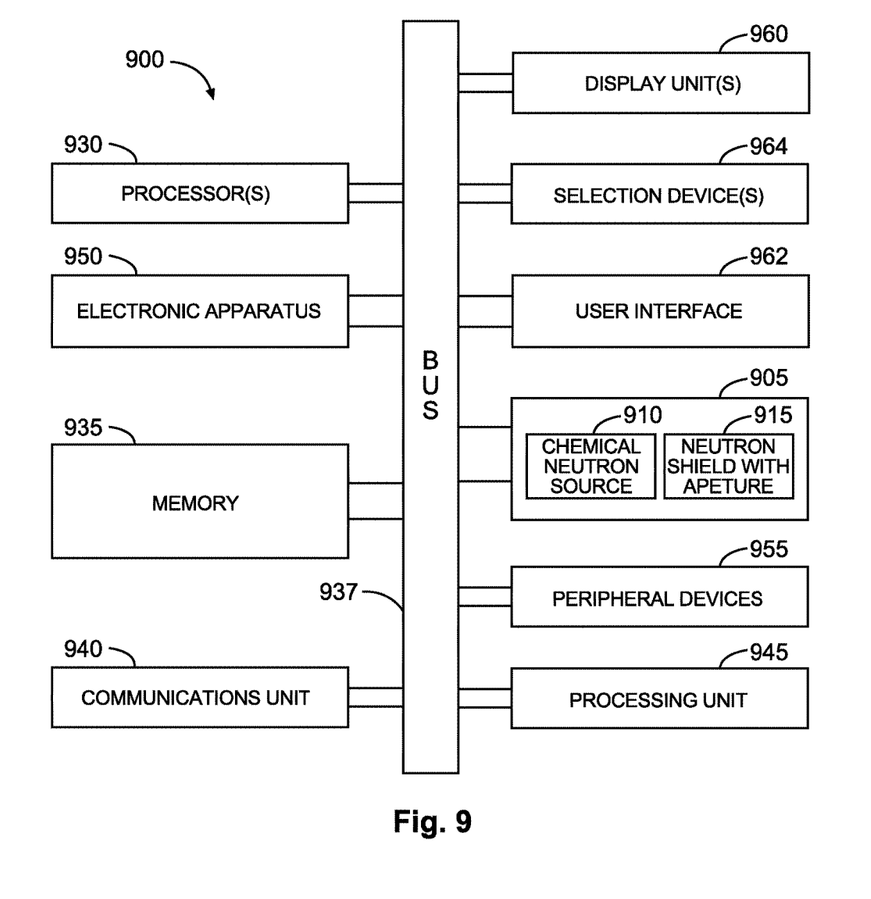
FIG. 9 depicts a block diagram of features of an example system operable to provide and control a pulsed chemical neutron source, in accordance with various embodiments.

FIG. 9 depicts a block diagram of features of an embodiment of an example system 900 operable to implement a pulsed chemical neutron source. The system 900 can include a pulsed neutron generator 905 having a chemical neutron emitter 910 and a neutron shield with aperture 915, where the chemical neutron emitter 910 and the neutron shield with aperture 915 can be structured with an arrangement similar to or identical to arrangements discussed herein or combinations thereof. The system 900 can include one or more processors 930, a user interface 962 operable with the one or more processors 930, a processing unit 945 operable with the user interface 962, where the one or more processors 930, the user interface 962, and the processing unit 945 can be structured to be operated according to any scheme similar to or identical to the schemes associated with controlling and regulating a pulsed neutron generator 905 as taught herein.

In an embodiment, the processor(s) 930 can be realized as a single processor or a group of processors. Processors of the group of processors may operate independently depending on an assigned function. The processor(s) 930 can be used to control movement of one or more of the chemical neutron emitter 910 or the neutron shield with aperture 915 with respect to each other such that the aperture and the chemical neutron emitter 910 operatively align with each other during a selected portion of the respective movement generating neutrons through the aperture providing pulsed neutron output from the pulsed neutron generator 905. The chemical neutron emitter 910 can be configured such that neutrons can be output from the chemical neutron emitter 910 in a given direction for alignment. The system 900 can be arranged to perform various operations on data, acquired from probing using the pulsed neutron generator 905 operational downhole to make measurements with respect to formations, to provide processing thereof.

The system 900 can be arranged as a distributed system and can include components in addition to the one or more processors 960, the user interface 962, and the processing unit 945. The system 900 can include electronic apparatus 950 having instrumentality to make measurements that provide data that can be operated in one format or another by the one or more processors 930, the user interface 962, and the processing unit 945 to present information regarding a formation. The electronic apparatus 950 can include sensors to receive signals in response to using the pulsed neutron generator 905. The electronic apparatus 950 can include timing circuitry operable with the mechanical mechanism associated with the chemical neutron emitter 910 and the neutron shield with the aperture 915 to provide a chopping function to neutrons emitted from the chemical neutron emitter 910 to generate pulsed neutrons from the aperture of the neutron shield. The electronic apparatus 950 can include drives and motors to control movement of the chemical neutron emitter 910, the neutron shield with aperture 915, or combination of the chemical neutron emitter 910 and the neutron shield with the aperture 915 in a manner identical to or similar to the mechanisms discussed herein. The motion of the chemical neutron emitter 910, the neutron shield with aperture 915, or combination of the chemical neutron emitter 910 and the neutron shield with aperture 915 can be regulated by the electronic apparatus 950 or other components of system to operate a selected frequency or variable frequencies.

The system 900 can include a memory 935 and a communications unit 940. The processor(s) 930, the memory 935, and the communications unit 940 can be arranged to operate as a processing unit to control management of the pulsed neutron generator 905 and to perform operations on data signals collected from using the pulsed neutron generator 905. The memory 935 can include a database having information and other data such that the system 900 can operate on data generated from using the pulsed neutron generator 905. In an embodiment, the processing unit 945 can be distributed among the components of the system 900 including the electronic apparatus 950.

The communications unit 940 can include downhole communications for communication to the surface at a well. Such downhole communications can include a telemetry system. The communications unit 940 may use combinations of wired communication technologies and wireless technologies at frequencies that do not interfere with ongoing measurements. The communications unit 940 can allow for a portion or all of the data analysis to be conducted downhole with results provided to the user interface 962 for presentation on one or more display unit(s) 960 aboveground. However, the communications unit 940 can provide for data to be sent aboveground such that substantially all analysis is preformed aboveground. The communications unit 940 can allow for transmission of commands to the pulsed neutron generator 905 or drilling control downhole in response to signals provided by a user through the user interface 962, which allows interactive control of a drilling operation.

The system 900 can also include a bus 937, where the bus 937 provides electrical conductivity among the components of the system 900. The bus 937 can include an address bus, a data bus, and a control bus, each independently configured. The bus 937 can be realized using a number of different communication mediums that allows for the distribution of components of the system 900. Use of the bus 937 can be regulated by the processor(s) 930. Bus 937 can include a network to transmit and receive signals including data signals and command and control signals.

In various embodiments, the peripheral devices 955 can include additional storage memory and/or other control devices that may operate in conjunction with the processor(s) 930 and/or the memory 935. Display unit(s) 960 can be arranged with a screen display, as a distributed component on the surface, that can be used with instructions stored in the memory 935 to implement the user interface 962 to manage the operation of the pulsed neutron generator 905 and/or components distributed within the system 900. Such a user interface can be operated in conjunction with the communications unit 940 and the bus 937. The display unit(s) 960 can include a video screen, a printing device, or other structure to visually project information. The system 900 can include a number of selection devices 964 operable with the user interface 962 to provide user inputs to operate processing unit 945 or its equivalent. The selection device(s) 964 can include one or more of a touch screen or a computer mouse operable with the user interface 962 to provide user inputs to operate the processing unit 945.

The system 900 can be compatible with a logging while drilling operation. The system 900 can be also compatible with a wireline operation. The system 900 can be arranged as a distributed system for a land-based drilling operation, a sea-based drilling operation, or a drilling operation having land-based and sea-based components.

Figure 10:
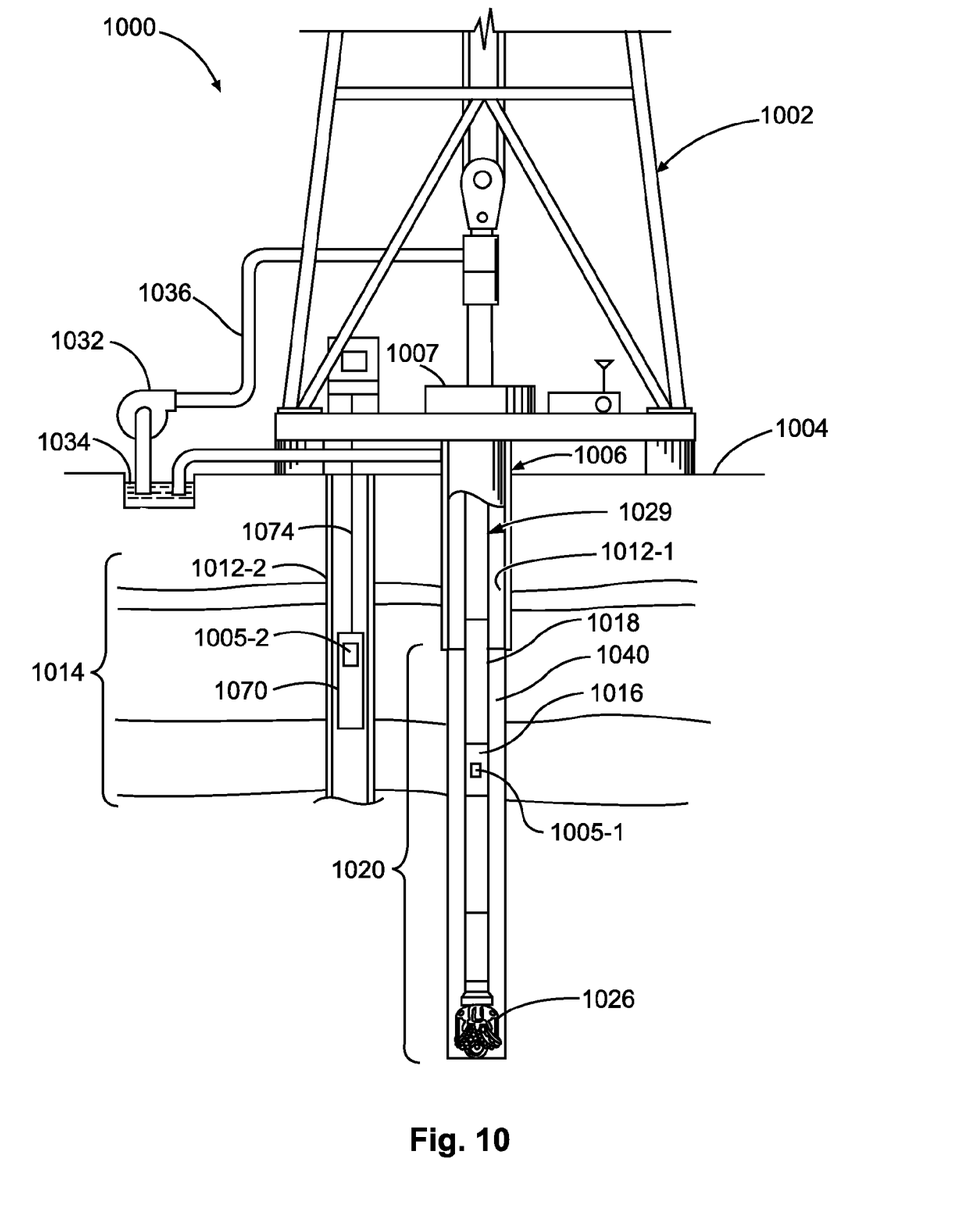
FIG. 10 depicts an example system at a drilling site, where the system is operable to provide and control a pulsed chemical neutron source, in accordance with various embodiments.

FIG. 10 depicts an embodiment of a system 1000 at a drilling site, where the system 1000 includes an apparatus operable to use a pulsed chemical neutron source with respect to a drilling operation. The system 1000 can include a tool 1005-1, 1005-2, or both 1005-1 and 1005-2 having a pulsed neutron generator including a chemical neutron emitter and a neutron shield with an aperture, where the chemical neutron emitter and the neutron shield with aperture structured with an arrangement similar to or identical to arrangements discussed herein or combinations thereof. The tools 1005-1 and 1005-2 can be structured to include a chemical neutron emitter/neutron shield architecture identical to or similar to chemical neutron emitter/neutron shield arrangements or combinations of such architectures discussed above. The tools 1005-1, 1005-2, or both 1005-1 and 1005-2 can be distributed among the components of system 1000.

The system 1000 can include a drilling rig 1002 located at a surface 1004 of a well 1006 and a string of drill pipes, that is, drill string 1029, connected together so as to form a drilling string that is lowered through a rotary table 1007 into a wellbore or borehole 1012-1. The drilling rig 1002 can provide support for the drill string 1029. The drill string 1029 can operate to penetrate rotary table 1007 for drilling the borehole 1012-1 through subsurface formations 1014. The drill string 1029 can include a drill pipe 1018 and a bottom hole assembly 1020 located at the lower portion of the drill pipe 1018.

The bottom hole assembly 1020 can include a drill collar 1016 and a drill bit 1026. The drill bit 1026 can operate to create the borehole 1012-1 by penetrating the surface 1004 and the subsurface formations 1014. The bottom hole assembly 1020 can include the tool 1005-1 attached to the drill collar 1016 to conduct measurements to determine formation parameters. The tool 1005-1 can be structured for an implementation as a measurements-while-drilling (MWD) system such as a logging-while-drilling (LWD) system. The housing containing the tool 1005-1 can include electronics to initiate measurements using a pulsed chemical neutron source and to collect measurement signals in the measurement process. Such electronics can include a processing unit to provide analysis of formation parameters over a standard communication mechanism for operating in a well. Alternatively, electronics can include a communications interface to provide measurement signals collected by the tool 1005-1 to the surface over a standard communication mechanism for operating in a well, where these measurements signals can be analyzed at a processing unit at the surface to provide analysis of formation parameters.

During drilling operations, the drill string 1029 can be rotated by the rotary table 1007. In addition to, or alternatively, the bottom hole assembly 1020 can also be rotated by a motor (e.g., a mud motor) that is located downhole. The drill collars 1016 can be used to add weight to the drill bit 1026. The drill collars 1016 also can stiffen the bottom hole assembly 1020 to allow the bottom hole assembly 1020 to transfer the added weight to the drill bit 1026, and in turn, assist the drill bit 1026 in penetrating the surface 1004 and the subsurface formations 1014.

During drilling operations, a mud pump 1032 can pump drilling fluid (sometimes known by those of skill in the art as "drilling mud") from a mud pit 1034 through a hose 1036 into the drill pipe 1018 and down to the drill bit 1026. The drilling fluid can flow out from the drill bit 1026 and be returned to the surface 1004 through an annular area 1040 between the drill pipe 1018 and the sides of the borehole 1012-1. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation cuttings created by operating the drill bit 1026.

In various embodiments, the tool 1005-2 may be included in a tool body 1070 coupled to a logging cable 1074 such as, for example, for wireline applications. The tool body 1070 containing the tool 1005-2 can include electronics to initiate measurements using a pulsed chemical neutron source and to collect measurement signals in the measurement process. Such electronics can include a processing unit to provide analysis of formation parameters over a standard communication mechanism for operating in a well. Alternatively, electronics can include a communications interface to provide measurement signals collected by the tool 1005-1 to the surface over a standard communication mechanism for operating in a well, where these measurements signals can be analyzed at a processing unit at the surface to provide analysis of formation parameters. The logging cable 1074 may be realized as a wireline (multiple power and communication lines), a mono-cable (a single conductor), and/or a slick-line (no conductors for power or communications), or other appropriate structure for use in the borehole 1012. Though FIG. 10 depicts both an arrangement for wireline applications and an arrangement for LWD applications, the system 1000 may be also realized for one of the two applications.

In various embodiments, a device can be implemented using a mechanical chopper-like mechanism with radioactive isotopes to function as a pulsed chemical neutron source. Such a source combined with a timing circuitry can be used on well logging tools. The device can utilize a chemical radioactive emitter, which has a lifespan depending upon the half-life of the radioisotope (from several to several hundreds of years), with a rugged mechanical design. Comparing to a neutron generator, the system complexity of the pulsed chemical neutron source can be simplified. In addition, the radioactive neutron emission may be less affected by environmental effects, such as temperature.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
a chemical neutron emitter;
a neutron shield having an aperture, at least one of the neutron shield and the chemical neutron emitter arranged for linear movement through a position that aligns the chemical neutron emitter with the aperture of the neutron shield; and
a control unit that controls the movement of at least one of the chemical neutron emitter and the neutron shield to chop a neutron beam emitted from the chemical neutron emitter with the neutron shield.

2. The apparatus of claim 1, wherein:
the chemical neutron emitter is fixed in position;
the neutron shield is arranged for linear movement with respect to the chemical neutron emitter; and
the control unit controls linear movement of the neutron shield.

3. The apparatus of claim 2, wherein the neutron shield is arranged to oscillate linearly with respect to the chemical neutron emitter.

4. The apparatus of claim 1, further comprising:
wherein the neutron shield is fixed in position;
wherein the chemical neutron emitter is arranged for linear movement with respect to the neutron shield; and
the control unit controls linear movement of the chemical neutron emitter.

5. The apparatus of claim 4, further comprising:
a platform, wherein the chemical neutron emitter is attached to the platform, the platform structured for linear movement with respect to the neutron shield; and
wherein the control unit that controls the linear movement of the chemical neutron emitter moves the platform.

6. The apparatus of claim 5, wherein the platform is structured to oscillate linearly with respect to the neutron shield.

7. The apparatus of claim 4, wherein the control unit includes circuitry structured to regulate motion of the chemical neutron emitter or the neutron shield at a selected frequency.

8. The apparatus of claim 1, wherein the apparatus includes:
a processing unit arranged to process signals collected in response to generation of neutrons from the aperture in a borehole; and
a communications unit to transmit results from the processing unit.

9. The apparatus of claim 1, wherein the chemical neutron emitter includes one or more radioactive isotopes.

10. A method comprising:
generating neutrons from a chemical neutron emitter; and
linearly moving one or more of the chemical neutron emitter or a neutron shield through a position at which an aperture of the neutron shield is aligned with the chemical neutron emitter to pass neutrons output through the aperture.

11. The method of claim 10, wherein linearly moving includes moving the neutron shield with the chemical neutron emitter fixed or linearly moving the chemical neutron emitter with the neutron shield fixed.

12. The method of claim 10, wherein linearly moving includes an oscillatory linear motion.

13. The method of claim 10, wherein linearly moving includes moving with a selected frequency of movement.

14. The method of claim 10, wherein linearly moving includes moving with a selected variation of frequency of movement.

15. The method of claim 10, further comprising:
analyzing signals from generating the pulses of neutrons output in a borehole; and
directing a drilling-based operation in response to analyzing the signals.

16. An apparatus comprising:
a neutron shield having an aperture;
a chemical neutron emitter arranged to move through a position that aligns the chemical neutron emitter with the aperture of the neutron shield; and
a control unit that controls the movement of the chemical neutron emitter to chop a neutron beam emitted from the chemical neutron emitter with the neutron shield.

17. An apparatus of claim 16, wherein the apparatus includes a backstop partially encircling the chemical neutron emitter, the backstop disposed between the chemical neutron emitter and neutron shield.

18. The apparatus of claim 16, wherein the chemical neutron emitter is rotatable such that the chemical neutron emitter is operatively aligned with the aperture at one angular region in a rotation of the chemical neutron emitter.

19. The apparatus of claim 16, wherein the chemical neutron emitter includes one or more radioactive isotopes.

20. The apparatus of claim 16, wherein the chemical neutron emitter is rotatable with the neutron shield surrounding the chemical neutron emitter such that the chemical neutron emitter is operatively aligned with the aperture at one angular region in each rotation of the chemical neutron emitter.

21. The apparatus of claim 20, further comprising:
a platform, wherein the chemical neutron emitter is attached to the platform, the platform structured to rotate with respect to the neutron shield; and wherein the control unit that controls movement of the chemical neutron emitter moves the platform.

22. The apparatus of claim 16, wherein the control unit includes circuitry to regulate motion of the chemical neutron emitter at a selected frequency.

23. The apparatus of claim 16, wherein the apparatus includes:
- a processing unit arranged to process signals collected in response to generation of neutrons from the aperture in a borehole; and
- a communications unit to transmit results from the processing unit.

24. A method comprising:
generating neutrons from a chemical neutron emitter; and
moving the chemical neutron emitter through a position at which an aperture of a neutron shield is aligned with the chemical neutron emitter to pass pulses of neutrons output through the aperture.

25. The method of claim 24, wherein the neutron shield is fixed in position.

26. The method of claim 24, wherein moving the chemical neutron emitter comprises moving the chemical neutron emitter in a rotational motion.

27. The method of claim 24, wherein moving the chemical neutron emitter comprises moving with a selected frequency of movement.

28. The method of claim 24, wherein moving the chemical neutron emitter comprises moving with a selected variation of frequency of movement.

29. The method of claim 24, further comprising:
- analyzing signals from generating the pulses of neutrons output in a borehole; and
- directing a drilling-based operation in response to analyzing the signals.

\* \* \* \* \*